July 20, 1937.  C. H. MOSSBURG  2,087,807
AUTOMOBILE RADIATOR STRAINER
Filed Oct. 23, 1935
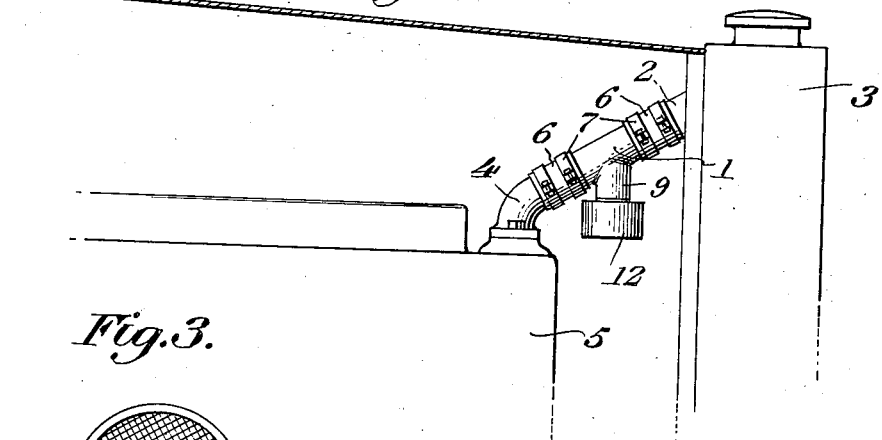
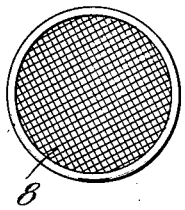
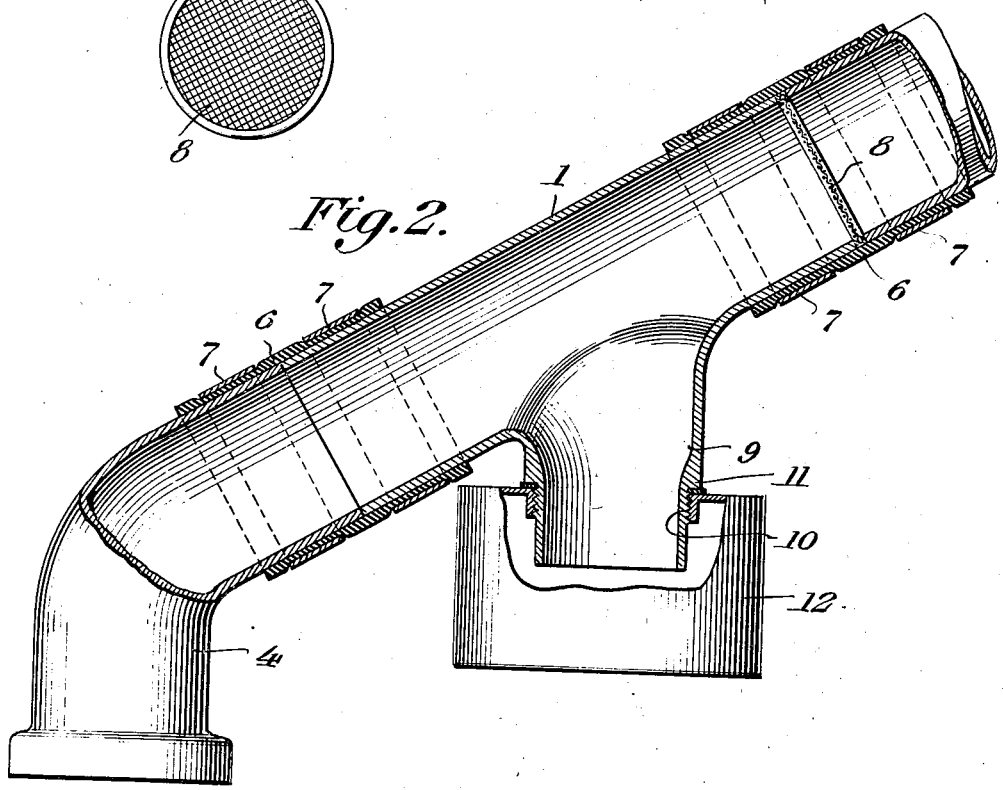
Clifford H. Mossburg
INVENTOR
BY Victor J. Evans & Co.
ATTORNEYS Patented July 20, 1937

2,087,807

UNITED STATES PATENT OFFICE 2,087,807

AUTOMOBILE RADIATOR STRAINER

Clifford H. Mossburg, McKeesport, Pa.

Application October 23, 1935, Serial No. 46,419

1 Claim. (Cl. 210—165)

This invention relates to an automobile radiator strainer and has for the primary object the provision of a device of this character which may be readily adapted to an automobile between the engine and the radiator for the purpose of collecting dirt and other foreign matter which may attempt to pass with the cooling fluid from the engine to the radiator and thereby eliminate possibility of the radiator becoming clogged and which may be readily emptied of its collected material or matter.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary side elevation, partly in section, showing an engine and radiator of an automobile equipped with a strainer constructed in accordance with my invention.

Figure 2 is a side elevation, partly in section, showing the strainer.

Figure 3 is a plan view illustrating the strainer element.

Referring in detail to the drawing, the numeral 1 indicates a tubular member which may be readily interposed between the intake neck 2 of an automobile radiator 3 and the outlet neck 4 of the cooling jacket of the engine 5 of said automobile so that the cooling fluid passing from the cooling jacket of the engine to the radiator will be compelled to travel through the tubular body 1. Flexible hose sections 6 connect the ends of the body 1 to the necks 2 and 4. Suitable clamps 7 are employed to establish a leak-proof connection between the hose connections and the ends of the body 1 and the necks 2 and 4.

A screen element 8 is placed in the body 1 or between one end of said body and the intake neck 2 of the radiator for the purpose of intercepting foreign material passing from the cooling jacket of the engine to the radiator and which will permit the cooling fluid to pass from the engine to the radiator. The body 1 when assembled to the engine and radiator as heretofore described is disposed at an inclination with the screen element 8 disposed in the uppermost end of the body so that any foreign matter intercepted by the screen element will be caused to slide downwardly and pass through a discharge portion 9. The discharge portion 9 depends downwardly from the body and is provided with a reduced screw threaded portion 10 defining a shoulder 11. The reduced portion 10 is threaded into a threaded opening formed in the top of a collecting receptacle 12. The opening of the collecting receptacle 12 is arranged inwardly of the side walls of the collecting receptacle and the screw threaded portion projects a distance below the top wall so that any foreign matter entering the collecting receptacle will not readily pass out of said collecting receptacle during the use of the device by way of the discharge portion 9. The collecting receptacle 12 being disposed in a plane below the flow of cooling fluid through the body will not be unduly agitated thereby and allowed to remain comparatively quiet within the collecting receptacle. The latter may be readily detached from the reduced portion 10 of the discharge portion 9 so that it may be emptied of the collected foreign matter. A gasket is interposed between the shoulder 11 and the top wall of the collecting receptacle to prevent leakage.

A device of the character described is efficient in operation and simple to adapt to an automobile without undue alterations and may be manufactured and sold at a low cost.

Having described the invention, I claim:

A device for the purpose set forth comprising a tubular casting to be arranged at an angle between the inlet of a radiator and the outlet of a cooling jacket of an engine and being of the same diameter as said inlet and outlet, a disk strainer arranged between the confronting ends of the said casting and the inlet of the radiator, said tubular member having an integral depending branch which is formed with an annular shoulder and a threaded portion which extends from said shoulder and a sediment trap, comprising a hollow body having a flat top provided with a round opening, an inwardly directed flange carried by said top, said flange being provided with interior threads to be engaged by the exteriorly threaded branch of the tubular member to allow the top of said trap to contact with the shoulder of said branch and the portion of said branch beyond the shoulder to be "projected into the trap".

CLIFFORD H. MOSSBURG.